(12) United States Patent
Marino et al.

(10) Patent No.: US 9,839,235 B1
(45) Date of Patent: Dec. 12, 2017

(54) BUTANE DISPENSING APPARATUS

(71) Applicants: John Marino, Lockport (CA); Marilyn Marino, Lockport (CA)

(72) Inventors: John Marino, Lockport (CA); Marilyn Marino, Lockport (CA)

(*) Notice: Subject to any disclaimer, the term of this patent is extended or adjusted under 35 U.S.C. 154(b) by 50 days.

(21) Appl. No.: 15/174,780

(22) Filed: Jun. 6, 2016

(51) Int. Cl.
| | | |
|---|---|---|
| *B01D 11/02* | (2006.01) | |
| *A24B 15/24* | (2006.01) | |
| *A24F 47/00* | (2006.01) | |
| *B01L 9/04* | (2006.01) | |
| *B01D 11/00* | (2006.01) | |

(52) U.S. Cl.
CPC .......... *A24B 15/246* (2013.01); *A24F 47/002* (2013.01); *B01D 11/0219* (2013.01); *B01D 11/0288* (2013.01); *B01L 9/04* (2013.01); *B01D 2011/007* (2013.01)

(58) Field of Classification Search
CPC ...... B01L 9/04; B01L 9/50; B01L 9/54; B01F 1/0027; A24B 15/246; B01D 11/0219; B01D 11/0288; B01D 2011/007; A24F 47/002
See application file for complete search history.

(56) References Cited

U.S. PATENT DOCUMENTS

2016/0136541 A1* 5/2016 Jones ................. B01D 11/0219
424/725

* cited by examiner

*Primary Examiner* — Timothy Cleveland
(74) *Attorney, Agent, or Firm* — RG Patent Consulting, LLC; Rachel Gilboy

(57) ABSTRACT

An apparatuses used for the safe dispensation of compressed liquid/gas butane from a compressed liquid/gas butane can for use in mixing this liquid/gas with parts of a marijuana plant within a glass tube of the apparatus to thereby remove the THC from the marijuana plant and disposing it and the residual liquid/gasses into a capture member for further processing.

18 Claims, 2 Drawing Sheets

BUTANE DISPENSING APPARATUS

BACKGROUND OF THE INVENTION

1. Field of the Invention

The present invention relates generally to the field apparatuses used for the safe dispensation of compressed liquid/gas butane from a compressed liquid/gas butane can for use in mixing this liquid/gas with parts of a marijuana plant within a glass tube of the apparatus to thereby remove the THC from the marijuana plant and disposing it and the residual liquid/gasses into a capture member for further processing.

2. Description of the Related Art

Previous attempts to dispense compressed liquid/gas butane from a compressed liquid/gas butane can for use in mixing with parts of a marijuana plant within a glass tube of the apparatus to thereby remove the THC from the marijuana plant would include holding the liquid/gas butane can in one's hand, pressing the top of the can and it's dispenser nozzle against a portion of a glass tube of the previously known butane gas can dispenser apparatus and holding the can in place while the liquid/gas butane is removed therefrom. The danger with this previous apparatus and method is that the user must remain adjacent the apparatus and hold the liquid/gas butane can in place while it is dispensing the liquid/gas butane therefrom, and as such have to breath in escaped and residual liquid/gas butane. Therefore, it became evident that an improved method and apparatus was necessary to avoid breathing in this toxic substance.

BRIEF SUMMARY OF THE INVENTION

In view of the foregoing disadvantages inherent in the known liquid/gas can dispensation art, the present invention provides a novel butane dispensing apparatus that includes a platform having a support column and trigger mechanism adapted to hold and press a butane liquid/gas can against a glass tube for mixing the butane liquid/gas contents with parts of a marijuana plant within the glass tube to thereby remove the THC from the marijuana plant and dispose it and the residual liquid/gasses into a capture member for further processing. The features of the invention which are believed to be novel are particularly pointed out and distinctly claimed in the concluding portion of the specification. These and other features, aspects, and advantages of the present invention will become better understood with reference to the following drawings and detailed description.

BRIEF DESCRIPTION OF THE DRAWINGS

The figures which accompany the written portion of this specification illustrate embodiments and method(s) of use for the present invention, Multi-Brush & Flex-Head Paint Pole, constructed and operative according to the teachings of the present invention.

The various embodiments of the present invention will hereinafter be described in conjunction with the appended drawings.

DETAILED DESCRIPTION

As discussed above, embodiments of the present invention relate to a novel butane dispensing apparatus that includes a platform having a support column and trigger mechanism adapted to hold and press a butane liquid/gas can against a glass tube for mixing the butane liquid/gas contents with parts of a marijuana plant within the glass tube to thereby remove the THC from the marijuana plant and dispose it and the residual liquid/gasses into a capture member for further processing.

Figure 2:
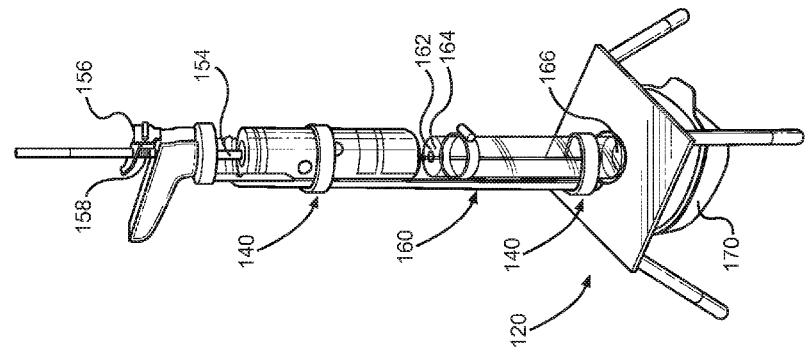
FIG. 2 is a perspective view illustrating the improved compressed liquid/gas can dispenser apparatus and a compressed liquid/gas can installed upon the support column.
Figure 1:
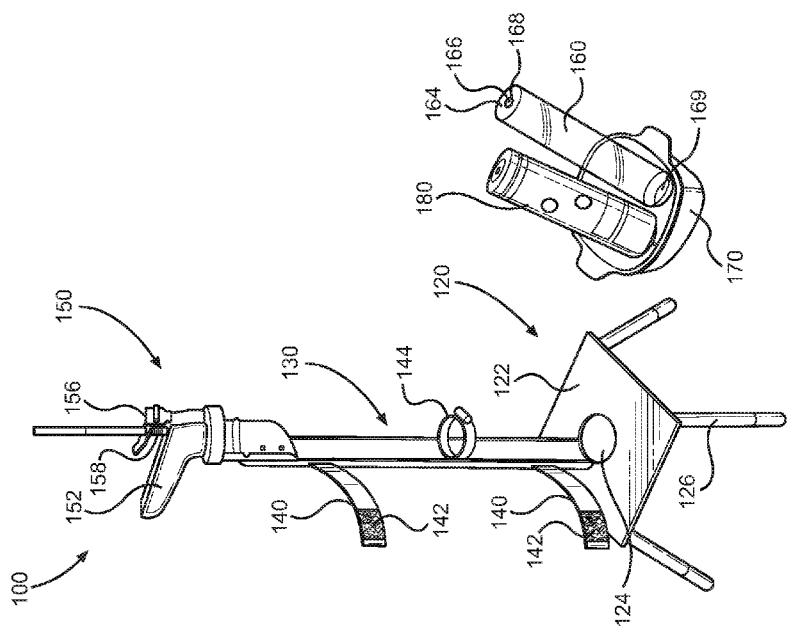
FIG. 1 is a perspective view illustrating the improved compressed liquid/gas can dispenser apparatus and a compressed liquid/gas can before installation upon its support column.
Figure 4:
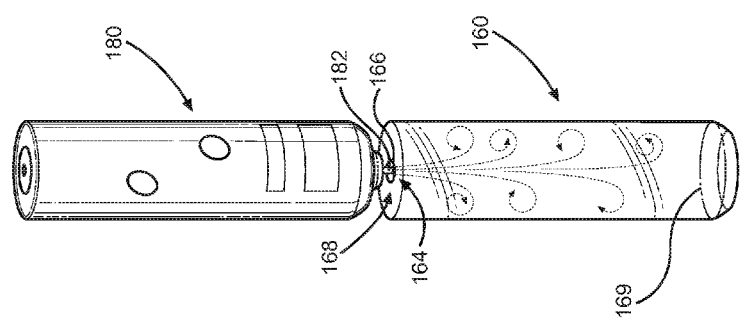
FIG. 4 is a perspective view illustrating the connection between the compressed liquid/gas can and the cylindrical tube member of FIG. 1.
Figure 3:
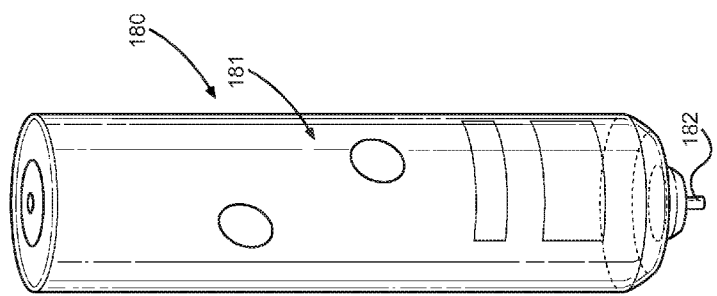
FIG. 3 is a perspective view illustrating the compressed liquid/gas can of illustrated in FIG. 1.

Referring now to the drawings FIGS. 1-4, the improved compressed liquid/gas can dispenser apparatus 100 comprises a platform 120 including a panel member 122 having a center aperture 124 therethrough, at least three leg members 126 attached to said panel member and extending therefrom and adapted to hold said panel member in a substantially horizontal position with respect to a supporting surface; an elongated support column 130 including at least two attachment members 140 spaced apart and each connected between a distal end and a proximal end thereof, wherein said support column is rigidly attached at said distal end to said panel member of said platform adjacent said center aperture, and extends substantially vertically therefrom; a trigger member 150 including a handle portion 152, a plunger portion 154 adjustably connected to said handle portion, and a locking member 156 adapted to hold said plunger portion in a chosen position, wherein said trigger member is rigidly connected to said proximal end of said support column; an elongated cylindrical tube member 160 including a proximal end 162, wherein said proximal end includes a nozzle receiver portion 164 adapted to allow a nozzle of a compressed liquid/gas can dispenser to be pressed there against and permit liquid/gas from within said compressed liquid/gas can to exit said liquid/gas can and enter an interior portion of said cylindrical tube member, and a distal end 166, wherein said cylindrical tube member is releasably attached via one of said at least two attachment members to an end section of said support column adjacent said distal end, and is adapted to contact and fit within said center aperture of said panel member, and wherein said cylindrical tube member is adapted to allow said liquid/gas exited from said compressed liquid/gas can to pass therethrough; and a capture member 170, wherein said capture member is adapted to be placed below and in proximity to said platform aperture, and wherein said capture member is shaped and adapted to capture said liquid/gas exited from said cylindrical tube member passing therethrough; wherein said improved compressed liquid/gas can dispenser apparatus is adapted such that a compressed liquid/gas can be removably retained via a second one of said at least two attachment members to an end section of said support column adjacent its said proximal end, such that said plunger portion of said trigger member can press against and push said liquid/gas can toward said nozzle receiver portion of said cylindrical tube member until said liquid/gas can begins to discharge said liquid/gas from said compressed liquid/gas can, and said second one of said at least two attachment members and said locking member of said trigger member together function to hold said liquid/gas can in place until all of said liquid/gas has exited said liquid/gas can.

The second one of said at least two attachment members 140 and said locking member 156 of said trigger member 150 are adapted and function such that when all of said liquid/gas has exited said liquid/gas can they can be disengaged and said liquid/gas can removed from said apparatus and discarded.

The at least two attachment members 140 are formed as flexible straps having hook and loop material 142 on respective ends thereof. Further, the at least two attachment members 140 includes a third attachment member 144 adapted to be attached to a middle section of said support column 130 and releasably hold said proximal end of said cylindrical tube member 160 thereto. The third attachment member 144 can be formed as an adjustable screw bolt pipe clamp.

The elongated support column 130 can have a curved cross-section. And, the platform 120 and said elongated support column 130 can be formed from a metallic material.

The locking member 156 of said trigger member 150 can be formed as a linear ratchet mechanism 158.

The nozzle receiver portion 164 of said proximal end of said cylindrical tube member 160 includes an entrance aperture 166 through said proximal end and a retaining surface 168 in proximity to said aperture and adapted to engage said nozzle of said compressed liquid/gas can, such that when said compressed liquid/gas can is pressed there against said liquid/gas is forced to exit said compressed liquid/gas can and into said cylindrical tube member; and wherein said distal end of said cylindrical tube member 160 includes an exit aperture 169.

The cylindrical tube member 160 is formed from glass. And the capture member 170 can be formed having a bowl shape.

The compressed liquid/gas can 180 includes a cylindrical canister 181, a compressed liquid/gas retained and compressed within said canister, and a nozzle 182 attached to a top section of said canister and adapted to selectively release said compressed gas/liquid.

The embodiments of the invention described herein are exemplary and numerous modifications, variations and rearrangements can be readily envisioned to achieve substantially equivalent results, all of which are intended to be embraced within the spirit and scope of the invention. Further, the purpose of the foregoing abstract is to enable the U.S. Patent and Trademark Office and the public generally, and especially the scientist, engineers and practitioners in the art who are not familiar with patent or legal terms or phraseology, to determine quickly from a cursory inspection the nature and essence of the technical disclosure of the application.

What is claimed is new and desired to be protected by Letters Patent is set forth in the appended claims:

1. An improved compressed liquid/gas can dispenser apparatus comprising:
    a platform comprising:
        a panel member having a center aperture therethrough;
        at least three leg members attached to said panel member and extending therefrom and adapted to hold said panel member in a substantially horizontal position with respect to a supporting surface;
    an elongated support column comprising:
        at least two attachment members spaced apart and each connected between a distal end and a proximal end thereof;
        wherein said support column is rigidly attached at said distal end to said panel member of said platform adjacent said center aperture, and extends substantially vertically therefrom;
    a trigger member comprising:
        a handle portion;
        a plunger portion adjustably connected to said handle portion; and
        a locking member adapted to hold said plunger portion in a chosen position;
        wherein said trigger member is rigidly connected to said proximal end of said support column;
    an elongated cylindrical tube member comprising:
        a proximal end;
            wherein said proximal end includes a nozzle receiver portion adapted to allow a nozzle of a compressed liquid/gas can dispenser to be pressed there against and permit liquid/gas from within said compressed liquid/gas can to exit said liquid/gas can and enter an interior portion of said cylindrical tube member; and
        a distal end;
        wherein said cylindrical tube member is releasably attached via one of said at least two attachment members to an end section of said support column adjacent said distal end, and is adapted to contact and fit within said center aperture of said panel member; and
        wherein said cylindrical tube member is adapted to allow said liquid/gas exited from said compressed liquid/gas can to pass therethrough; and
    a capture member;
        wherein said capture member is adapted to be placed below and in proximity to said platform aperture; and
        wherein said capture member is shaped and adapted to capture said liquid/gas exited from said cylindrical tube member passing therethrough;
    wherein said improved compressed liquid/gas can dispenser apparatus is adapted such that a compressed liquid/gas can be removably retained via a second one of said at least two attachment members to an end section of said support column adjacent its said proximal end, such that said plunger portion of said trigger member can press against and push said liquid/gas can toward said nozzle receiver portion of said cylindrical tube member until said liquid/gas can begins to discharge said liquid/gas from said compressed liquid/gas can, and said second one of said at least two attachment members and said locking member of said trigger member together function to hold said liquid/gas can in place until all of said liquid/gas has exited said liquid/gas can.

2. The improved compressed liquid/gas can dispenser apparatus of claim 1, wherein said second one of said at least two attachment members and said locking member of said trigger member are adapted and function such that when all of said liquid/gas has exited said liquid/gas can they can be disengaged and said liquid/gas can removed from said apparatus and discarded.

3. The improved compressed liquid/gas can dispenser apparatus of claim 1, wherein said at least two attachment members are formed as flexible straps having hook and loop material on respective ends thereof.

4. The improved compressed liquid/gas can dispenser apparatus of claim 1, wherein said at least two attachment members includes a third attachment member adapted to be attached to a middle section of said support column and releasably hold said proximal end of said cylindrical tube member thereto.

5. The improved compressed liquid/gas can dispenser apparatus of claim 4, wherein said third attachment member is formed as an adjustable screw bolt pipe clamp.

6. The improved compressed liquid/gas can dispenser apparatus of claim 1, wherein said elongated support column has a curved cross-section.

7. The improved compressed liquid/gas can dispenser apparatus of claim 1, wherein said platform and said elongated support column are formed from a metallic material.

8. The improved compressed liquid/gas can dispenser apparatus of claim 1, wherein said locking member of said trigger member is formed as a linear ratchet mechanism.

9. The improved compressed liquid/gas can dispenser apparatus of claim 1, wherein said nozzle receiver portion of said proximal end of said cylindrical tube member includes an entrance aperture through said proximal end and a retaining surface in proximity to said aperture and adapted to engage said nozzle of said compressed liquid/gas can, such that when said compressed liquid/gas can is pressed there against said liquid/gas is forced to exit said compressed liquid/gas can and into said cylindrical tube member; and wherein said distal end of said cylindrical tube member includes an exit aperture.

10. The improved compressed liquid/gas can dispenser apparatus of claim 1, wherein said cylindrical tube member is formed from glass.

11. The improved compressed liquid/gas can dispenser apparatus of claim 1, wherein capture member is formed having a bowl shape.

12. A combination of a compressed liquid/gas can and an improved compressed liquid/gas can dispenser apparatus, said combination comprising:
   a compressed liquid/gas can including;
      a cylindrical canister;
      compressed liquid/gas retained and compressed within said canister; and
      a nozzle attached to a top section of said canister and adapted to selectively release said compressed gas/liquid; and
   an improved compressed liquid/gas can dispenser apparatus comprising:
      a platform comprising:
         a panel member having a center aperture therethrough;
         at least three leg members attached to said panel member and extending therefrom and adapted to hold said panel member in a substantially horizontal position with respect to a supporting surface;
      an elongated support column comprising:
         at least two attachment members spaced apart and each connected between a distal end and a proximal end thereof;
         wherein said support column is rigidly attached at said distal end to said panel member of said platform adjacent said center aperture, and extends substantially vertically therefrom;
      a trigger member comprising:
         a handle portion;
         a plunger portion adjustably connected to said handle portion; and
         a locking member adapted to hold said plunger portion in a chosen position;
      wherein said trigger member is rigidly connected to said proximal end of said support column;
      an elongated cylindrical tube member comprising:
         a proximal end;
            wherein said proximal end includes a nozzle receiver portion adapted to allow a nozzle of a compressed liquid/gas can dispenser to be pressed there against and permit liquid/gas from within said compressed liquid/gas can to exit said liquid/gas can and enter an interior portion of said cylindrical tube member; and
         a distal end;
         wherein said cylindrical tube member is releasably attached via one of said at least two attachment members to an end section of said support column adjacent said distal end, and is adapted to contact and fit within said center aperture of said panel member; and
         wherein said cylindrical tube member is adapted to allow said liquid/gas exited from said compressed liquid/gas can to pass therethrough; and
      a capture member;
         wherein said capture member is adapted to be placed below and in proximity to said platform aperture; and
         wherein said capture member is shaped and adapted to capture said liquid/gas exited from said cylindrical tube member passing therethrough;
      wherein said improved compressed liquid/gas can dispenser apparatus is adapted such that a compressed liquid/gas can be removably retained via a second one of said at least two attachment members to an end section of said support column adjacent its said proximal end, such that said plunger portion of said trigger member can press against and push said liquid/gas can toward said nozzle receiver portion of said cylindrical tube member until said liquid/gas can begins to discharge said liquid/gas from said compressed liquid/gas can, and said second one of said at least two attachment members and said locking member of said trigger member together function to hold said liquid/gas can in place until all of said liquid/gas has exited said liquid/gas can.

13. The combination of claim 12, wherein said at least two attachment members are formed as flexible straps having hook and loop material on respective ends thereof.

14. The combination of claim 12, wherein said at least two attachment members includes a third attachment member adapted to be attached to a middle section of said support column and releasably hold said proximal end of said cylindrical tube member thereto.

15. The combination of claim 14, wherein said third attachment member is formed as an adjustable screw bolt pipe clamp.

16. The combination of claim 12, wherein said locking member of said trigger member is formed as a linear ratchet mechanism.

17. The combination of claim 12, wherein said nozzle receiver portion of said proximal end of said cylindrical tube member includes an entrance aperture through said proximal end and a retaining surface in proximity to said aperture and adapted to engage said nozzle of said compressed liquid/gas can, such that when said compressed liquid/gas can is pressed there against said liquid/gas is forced to exit said compressed liquid/gas can and into said cylindrical tube member; and wherein said distal end of said cylindrical tube member includes an exit aperture.

18. The combination of claim 12, wherein said cylindrical tube member is formed from glass.

\* \* \* \* \*